United States Patent [19]

Furuhashi et al.

[11] Patent Number: 5,245,001

[45] Date of Patent: Sep. 14, 1993

[54] AMINOARYLSULFONIC ACID-PHENOL-FORMALDEHYDE CONDENSATE AND CONCRETE ADMIXTURE COMPRISING THE SAME

[75] Inventors: Takahiro Furuhashi, Suita; Kazushige Kawada, Takarazuka; Susumu Tahara, Tsukuba; Toru Takeuchi, Tsukuba; Yuji Takahashi, Tsukuba; Toshikazu Adachi, Ibaragi; Tsutomu Teraji, Osaka, all of Japan

[73] Assignee: Fujisawa Pharmaceutical Co., Ltd., Osaka, Japan

[21] Appl. No.: 774,066

[22] Filed: Oct. 9, 1991

Related U.S. Application Data

[60] Division of Ser. No. 498,548, Mar. 26, 1990, Pat. No. 5,092,934, which is a division of Ser. No. 436,953, Nov. 15, 1989, Pat. No. 4,936,918, which is a continuation of Ser. No. 248,103, Sep. 23, 1988, abandoned.

[30] Foreign Application Priority Data

Sep. 25, 1987 [GB] United Kingdom ............... 8722608

[51] Int. Cl.$^5$ ............................................. C08G 75/00
[52] U.S. Cl. ................................. 528/171; 528/172; 528/173; 528/174; 528/129; 524/3; 524/4; 524/6; 524/843; 106/503; 106/725; 106/727; 106/808; 106/809
[58] Field of Search ............... 528/171, 172, 173, 174, 528/129; 106/503, 725, 727, 808, 809; 524/3, 4, 6, 843

[56] References Cited

U.S. PATENT DOCUMENTS

4,355,141  10/1982  Okada et al. .................... 526/62
4,936,918   6/1990  Furuhashi et al. ............... 106/808
5,092,934   3/1992  Furuhashi et al. ............... 106/808

FOREIGN PATENT DOCUMENTS

670573  4/1966  Belgium .
  99954  2/1984  European Pat. Off. .
2353642  5/1975  Fed. Rep. of Germany .
 838332  3/1939  France .
2070632  9/1981  United Kingdom .

OTHER PUBLICATIONS

Chatterjee, et al., "Influence of Comonomer Functional Groups on the Reactivity Ratios of Some Phenolic Monomers," J. Macromol. Sci., Chem., vol. A19, No. 8, 1983, pp. 1221-1235.

Primary Examiner—John Kight, III
Assistant Examiner—Richard Jones
Attorney, Agent, or Firm—Oblon, Spivak, McClelland, Maier & Neustadt

[57] ABSTRACT

The present invention relates to aminoarylsulfonic acid-phenol-formaldehyde condensate useful for incorporation into cementing compositions, for example, mortar, cement paste and the like, for improving slumping characteristics.

2 Claims, No Drawings

AMINOARYLSULFONIC ACID-PHENOL-FORMALDEHYDE CONDENSATE AND CONCRETE ADMIXTURE COMPRISING THE SAME

This is a division of application Ser. No. 07/498,548, filed on Mar. 26, 1990, now U.S. Pat. No. 5,092,934 which is a divisional of Ser. No. 07/436,953, filed Nov. 15, 1989, now U.S. Pat. No. 4,936,918 which is a continuation of of Ser. No. 07/248,103 filed Sept. 23, 1988 now abandoned.

The present invention relates to aminoarylsulfonic acid-phenol-formaldehyde condensate (hereinafter referred to as ASPFC) and concrete admixture comprising the same for incorporation in cementing composition, for example, concrete, mortar, cement paste and the like.

The concrete admixture which comprises ASPFC mentioned below improves consistency of fresh cementing composition, and further restrains the change of the fluidity such as slump less with the passage of time.

More definitely, when the concrete admixture of this invention is added to the cementing composition, the slump of the cementing composition can be increased without adding water and the cementing composition can be transported without slump loss for a long period of time, and further this concrete admixture facilitates flow rates of fresh cementing composition when the fresh cementing composition is pumped to a desired location during cementing operation.

ASPFC is a condensate prepared by polymerizing 20 to 70 parts by weight of a compound of the general formula:

$$R^1SO_3H \quad (I)$$

wherein $R^1$ is

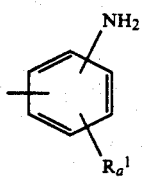

(wherein $R_a^1$ is hydrogen or lower alkyl) or

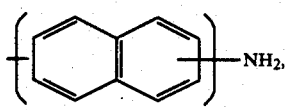

or its salt, 10 to 50 parts by weight of a compound of the general formula:

(II)

wherein $R^2$ is hydrogen, lower alkyl, lower alkoxy, hydroxy or carboxy, or its salt,
and 10 to 40 parts by weight of formaldehyde.

Since ASPFC of the present invention reduces apparently the viscosity of fresh cementing composition to which it is added, it is possible to reduce the unit water content of fresh cementing composition which results in greater compressive strength in the hardened concrete as obtained.

Up to now, although various kinds of concrete admixture are known in the art, they are insufficient in improvement of consistency of fresh cementing composition and in restraining of the change of the fluidity such as slump loss with the passage of time.

The inventors of the present invention have conducted the research work to find out more preferable concrete admixture which possesses improved characteristics in consistency and restraining of the change of fluidity such as slump loss with the passage of time, and have completed the present invention.

In the above and subsequent descriptions of the present specification, the various definitions which the present invention intends to include within the scope thereof are explained in detail as follows.

The term "lower" is used to intend a group having 1 to 6 carbon atom(s), unless otherwise provided.

Suitable "lower alkyl" may include straight or branched one, having 1 to 6 carbon atom(s), such as methyl, ethyl, propyl, isopropyl, butyl, t-butyl, pentyl, hexyl and the like.

Suitable "lower alkoxy" may include straight or branched one such as methoxy, ethoxy, propoxy, isopropoxy, butoxy, isobutoxy, pentyloxy, isopentyloxy, hexyloxy and the like.

ASPFC can be prepared by polymerizing 20 to 70 parts by weight of a compound (I), 10 to 50 parts by weight of a compound (II) and 10 to 40 parts by weight of formaldehyde in an aqueous condition under warming or heating.

Now, in order to show the utility of ASPFC of the present invention, the test data of the representative ASPFCs on mortar and concrete are shown in the following.

TEST 1 MORTAR SLUMP TEST

(1) Test Method

Consistency was measured by mortar slump test at 20° C., and slump of the mortars containing the test compounds was compared with that of the reference mortar (non-additive).

Materials and the mortar composition utilized in the test were 700 g of ordinary Portland cement specified in JIS R 5210, 1960 g of river sand (specific gravity: 2.63, fineness modulus: 2.66) and 339.5 ml of water or an aqueous solution containing 2.8 g of the test compound.

The mortars were made by mechanical mixing of ingredients according to the standard method in JIS R 5201.

Mortar slump was determined in accordance with JIS A 1101 by using a slump corn of half size of the standard mold (with base 100 mm in diameter, top 50 mm in diameter and the height 150 mm).

Air content of the test mortar was measured by gravimetric method.

After initial measurement of the slump and air content, the mortar was recovered into the mixing bowl, allowed to stand for 60 minutes and then remixed by using mixing spoon in the bowl.

The slump and air content was measured again, as described above.

(2) Test Results

The test results are given in Table 1.

TABLE 1

| Test compounds (Example Nos.) | Slump (cm) 0 min. | Slump (cm) 60 min. | Air content (%) 0 min. | Air content (%) 60 min. |
| --- | --- | --- | --- | --- |
| 1 | 9.6 | 8.5 | 2.7 | 2.2 |
| 2 | 10.2 | 7.4 | 2.2 | 1.8 |
| 3 | 9.3 | 7.4 | 4.1 | 3.1 |
| 4 | 10.7 | 7.9 | 2.8 | 1.1 |
| 5 | 9.3 | 6.3 | 2.4 | 2.1 |
| 6 | 8.2 | 5.5 | 2.5 | 1.6 |
| 7 | 9.9 | 6.9 | 2.2 | 2.1 |
| 8 | 8.5 | 5.6 | 3.0 | 2.3 |
| 9 | 10.6 | 8.8 | 1.5 | 1.6 |
| 10 | 8.8 | 6.3 | 2.4 | 1.9 |
| 11 | 10.6 | 8.5 | 2.2 | 1.7 |
| 12 | 10.2 | 7.8 | 1.6 | 1.1 |
| 13 | 11.0 | 8.9 | 2.1 | 1.3 |
| 14 | 9.7 | 6.8 | 2.3 | 1.7 |
| 15 | 10.6 | 10.8 | 1.8 | 1.0 |
| 16 | 11.2 | 9.9 | 1.5 | 1.0 |
| 17 | 11.3 | 10.2 | 1.0 | 0.8 |
| 18 | 10.7 | 10.8 | 2.0 | 1.0 |
| 19 | 11.4 | 8.5 | 1.6 | 2.0 |
| 20 | 9.9 | 9.1 | 3.5 | 2.3 |
| 21 | 9.4 | 9.7 | 3.2 | 2.0 |
| 22 | 11.0 | 10.8 | 2.2 | 1.4 |
| 23 | 11.4 | 9.7 | 1.1 | 0.9 |
| 24 | 10.3 | 7.9 | 0.7 | 0.9 |
| 25 | 10.3 | 7.4 | 0.5 | 0.7 |
| 26 | 11.6 | 8.8 | 1.2 | 1.5 |
| 27 | 10.9 | 6.9 | 1.5 | 2.9 |
| 28 | 8.3 | 4.8 | 3.5 | 2.7 |
| 29 | 8.7 | 5.1 | 10.9 | 6.1 |
| 30 | 9.7 | 6.2 | 4.0 | 2.8 |
| 31 | 11.7 | 10.5 | 1.9 | 1.6 |
| 32 | 12.6 | 11.6 | 0.3 | 0.1 |
| 33 | 12.0 | 10.6 | 1.2 | 1.0 |
| 34 | 9.7 | 7.7 | 2.9 | 1.9 |
| 35 | 10.2 | 8.0 | 2.0 | 1.2 |
| 36 | 11.8 | 9.2 | 0.2 | 0.6 |
| 37 | 6.8 | 3.0 | 3.8 | 3.1 |
| 38 | 7.4 | 5.4 | 2.0 | 2.6 |
| 39 | 7.2 | 3.2 | 4.0 | 3.0 |
| Reference (non-additive) | 3.5 | — | 2.7 | — |

TEST 2 CONCRETE TEST (1) Test Method

Consistency of the concrete containing test compounds were compared with that of the plain concrete (non-additive), and slump loss (the time-dependent change of fluidity) of the concrete was compared with that of the reference concrete adjusted to the same initial slump by increasing unit water content. The method utilized in the test was the basic procedure described in the Japan Industrial Standard (JIS) A 6204 for chemical admixtures for concrete.

Materials utilized in the test were as follows:

Cement: a mixture of ordinary Portland cements specified in JIS R 5210 from three different manufacturers.
Fine aggregate: river sand
  specific gravity: 2.64
  fineness modulus: 2.75
Coarse aggregate: crushed stone
  specific gravity: 2.67
  fineness modulus: 6.70

Mix proportions of concrete are shown in Table 2. The concrete was prepared by mixing cement, aggregates and water or water containing a test compound in a forced mixing type mixer for 1.5 minutes on a scale of 30 liters, and was allowed to stand in a mixing plate.

Initial slump and the time-dependent change of slump (at every 30 minutes intervals to 1.5 hours) were measured after remixing in the mixing plate.

(2) Test Results

The results are given in Table 3.

TABLE 2

| Concrete | Water-cement ratio (%) | s/a (%) | Unit weight (kg/m$^3$) W | C | S | G |
| --- | --- | --- | --- | --- | --- | --- |
| Plain and test concrete | 58.1 | 49 | 186 | 320 | 909 | 957 |
| Reference concrete | 66.3 | 49 | 212 | 320 | 875 | 921 |

W: water, C: cement, S: sand, G: coarse aggregate
s/a: ratio of sand to aggregates (aggregates contain sand and coarse aggregate)

TABLE 3

| Concrete | Dosage of the test compounds [% (w/w) of cement] | Air content (%) | Slump (cm) 0 | 30 | 60 | 90 minutes |
| --- | --- | --- | --- | --- | --- | --- |
| Plain concrete | — | 1.2 | 8.0 | | | |
| Test concrete containing | | | | | | |
| a compound of Example 16 | 0.4 | 0.7 | 20.5 | 20.0 | 20.0 | 19.5 |
| a compound of Example 20 | 0.4 | 1.3 | 21.0 | 20.0 | 20.0 | 20.0 |
| a compound of Example 31 | 0.4 | 1.2 | 20.5 | 20.5 | 20.5 | 19.5 |
| Reference concrete | — | 0.8 | 20.5 | 17.5 | 15.5 | 14.0 |

As clear from the test results as stated above, ASPFC of the present invention improves consistency of cementing composition (cf. high initial slump) and restrains the slump loss with the passage of time in concrete as compared with the reference.

It might be clear from the test results shown in Table 3 that ASPFC much reduced unit water content without air-entraining.

Concrete having good fluidity can be prepared by admixing ASPFC (0.01 to 1.0% of cement, preferably 0.1 to 0.6% of cement) with the ordinary concrete.

Said ordinary concrete may include cement (5–25%), coarse aggregate (30–60%), fine aggregate (20–50%), water (4–10%), and air entraining agent (0–1% of cement) and/or water-reducing agent (0–1% of cement).

Mortar having good fluidity can be prepared by admixing ASPFC (0.01 to 1.0% of cement, preferably 0.1 to 0.6% of cement) with the ordinary mortar.

Said ordinary mortar may include cement (15–45 %), water (5–30%), sand (35–75%), and air entraining agent (0–1% of cement) and/or water-reducing agent (0–1% of cement).

Cement paste having good fluidity can also be prepared by admixing ASPFC (0.01 to 1.0% of cement, preferably 0.1 to 0.6% of cement) with the ordinary cement paste.

Said ordinary cement paste may include cement (20-80%) and water (80-20%).

As the cement, there may be mentioned cement currently on the market, such as ordinary portland cement, high-early-strength cement, moderate heat cement, blast-furnace slag cement and fly ash cement, with fly ash, granulated slag powder, siliceous admixtures and the like.

The following Examples are given for the purpose of illustrating the preparation of ASPFC of the present invention.

EXAMPLE 1

To a mixture of 4-aminobenzenesulfonic acid (8.66 g) and phenol (4.70 g) in water (30 ml) was added 20% aqueous sodium hydroxide (10.20 g) and the resulting solution was adjusted to pH 8.1 with 0.1N aqueous sodium hydroxide. A weight of the solution was adjusted to 56.00 g with water and then heated. To the solution was added 37% aqueous formaldehyde (8.10 g) under refluxing and the reaction mixture was stirred for 7.5 hours under refluxing. The solution was cooled to room temperature, adjusted to pH 11.0 with 20% aqueous sodium hydroxide (3.26 g) and condensed at 40° C. to afford an aqueous solution of the condensate (49.40 g).

Ratio (4-aminobenzenesulfonic acid:phenol: formaldehyde): 1:1:2
Ratio (starting monomers:water): 1:2.49

Viscosity of the aqueous solution of the condensate: 8.9 (cP at 25° C., 30%)
Molecular weight Mw 1976, Mn: 833

Examples 2 to 14 was conducted in a similar manner to that of Example 1.

| Example No. | Stating monomers | | Polymerizing conditions | | Resulting condensate | | |
|---|---|---|---|---|---|---|---|
| | Ratio (4-amino-benzenesulfonic acid: phenol:formaldehyde) | Ratio (starting monomers:water) | Initial pH | Reaction time | Viscosity | Molecular weight Mw | Mn |
| 2 | 1:1:2 | 1:2.49 | 8.3 | 7.5 | 9.4 | | |
| 3 | 1:1:2 | 1:2.49 | 7.9 | 7.5 | 10.3 | | |
| 4 | 1:1:2 | 1:2.21 | 8.1 | 7.5 | 10.3 | | |
| 5 | 1:1:2 | 1:2.49 | 8.1 | 7.0 | 10.1 | | |
| 6 | 1.1:0.9:2 | 1:2.47 | 8.1 | 7.5 | 8.9 | | |
| 7 | 0.9:1.1:2 | 1:2.51 | 8.1 | 7.5 | 10.4 | | |
| 8 | 1.2:0.8:2 | 1:2.45 | 8.1 | 7.5 | 8.2 | | |
| 9 | 1:1:2 | 1:2.49 | 8.5 | 7.5 | 8.8 | | |
| 10 | 1:1:2 | 1:2.49 | 7.7 | 7.5 | 10.6 | | |
| 11 | 1:1:2.1 | 1:2.48 | 8.1 | 7.5 | 10.0 | | |
| 12 | 1:1:2.2 | 1:2.47 | 8.1 | 7.5 | 9.8 | | |
| 13 | 1:1:3 | 1:2.36 | 8.1 | 7.5 | 9.1 | 3264 | 1957 |
| 14 | 1:1:2 | 1:1.94 | 8.1 | 7.5 | 10.6 | | |

Molecular weight was obtained using gel permeation method. Mw: weight average molecular weight, Mn: number average molecular weight Standard: sodium polystylene sulfonate
Viscosity: The viscosity of the solution was measured with a VISCONIC ED type viscometer (made by TOKYO KEIKI CO., LTD), cP at 25° C., 30%

EXAMPLE 15

To a mixture of 4-aminobenzenesulfonic acid (594.8 g) and phenol (323.2 g) in water (2000.0 ml) was added 20% aqueous sodium hydroxide (704.0 g) and the resulting solution was adjusted to pH 8.1 with 0.1N aqueous sodium hydroxide. The weight of the solution was adjusted to 3850.0 g with water and then heated. To the solution was added 37% aqueous formaldehyde (557.4 g) under refluxing and the reaction mixture was stirred for 7.5 hours under refluxing (1st step). The mixture was cooled to room temperature, adjusted to pH 11.0 with 20% aqueous sodium hydroxide (252.5 g) and refluxed for 3 hours (2nd step) to afford an aqueous solution of the condensate (4659.9 g).

Ratio (4-aminobenzenesulfonic acid:phenol: formaldehyde): 1:1:2
Ratio (starting monomers:water): 1:2.49
Molecular weight: Mw: 4336, Mn: 943

Examples 16 to 23 was conducted in a similar manner to that of Example 15.

| Example No. | Stating monomers | | Polymerizing conditions | | | | Resulting condensate | | |
|---|---|---|---|---|---|---|---|---|---|
| | Ratio (4-amino-benzenesulfonic acid: phenol:formaldehyde) | Ratio (starting monomers:water) | 1st Step | | 2nd Step | | | Molecular weight | |
| | | | Initial pH | Reaction time | Initial pH | Reaction time | Viscosity | Mw | Mn |
| 16 | 1:1:2 | 1:2.49 | 8.1 | 7.5 | 10.0 | 1.0 | 3.7 *1 | | |
| 17 | 1:1:2 | 1:2.49 | 8.1 | 7.5 | 10.0 | 3.0 | 3.7 *1 | 3775 | 1000 |
| 18 | 1:1:2 | 1:2.49 | 8.1 | 7.5 | 11.0 | 1.0 | 3.9 *2 | 2760 | 899 |
| 19 | 1:2:3 | 1:2.56 | 8.1 | 7.5 | 11.0 | 3.0 | | | |
| 20 | 1:1:2 | 1:2.49 | 8.1 | 7.5 | 12.0 | 1.0 | | 1920 | 737 |
| 21 | 1:1:2 | 1:2.49 | 8.1 | 7.5 | 12.0 | 3.0 | | 2034 | 696 |
| 22 | 1:1:2 | 1:2.49 | 8.1 | 7.5 | 11.0 | 5.0 | | | |
| 23 | 1:1:2 | 1:2.49 | 8.1 | 7.5 | 10.0 | 5.0 | | | |

Viscosity: *1: at 25° C., 22.3%; *2: at 25° C., 21.5%

EXAMPLE 24

To a mixture of 4-aminobenzenesulfonic acid (17.32 g) and pyrocatechol (11.01 g) in water (60 ml) was added 20% aqueous sodium hydroxide (21.12 g) and the resulting solution was adjusted to pH 8.1 with 0.1N aqueous sodium hydroxide. The weight of the solution was adjusted to 119.20 g with water and then heated. To the solution was added 37% aqueous formaldehyde (16.23 g) under refluxing and the reaction mixture was stirred for 7.5 hours under refluxing. Further, 37% aqueous formaldehyde (8.12 g) was added thereto under refluxing and stirred for 7.5 hours under refluxing (1st step). The mixture was cooled to room temperature, adjusted to pH 11.0 with 20% aqueous sodium hydroxide (7.72 g) and refluxed for 3 hours (2nd step) to afford an aqueous solution of the condensate (151.30 g).
Ratio (4-aminobenzenesulfonic acid:pyrocatechol: formaldehyde): 1:1:3
Ratio (starting monomers:water): 1:2.45
Viscosity of the aqueous solution of the condensate: 36.3 (cP at 25° C., 30%)
Molecular weight: Mw: 5832

EXAMPLE 25

To a mixture of 4-aminobenzenesulfonic acid (34.64 g) and hydroquinone (22.02 g) in water (122 ml) was added 20% aqueous sodium hydroxide (40.92 g) and the mixture was stirred at 50° C. The resulting solution was adjusted to pH 8.03 with 0.1N aqueous sodium hydroxide. The weight of the solution was adjusted to 238.40 g with water and then heated. To the solution was added 37% aqueous formaldehyde (32.46 g) under refluxing and the reaction mixture was stirred for 7.5 hours under refluxing (1st step). The mixture was cooled to room temperature, adjusted to pH 11.0 with 20% aqueous sodium hydroxide (25.04 g) and refluxed for 3 hours (2nd step) to afford an aqueous solution of the condensate (295.90 g).
Ratio (4-aminobenzenesulfonic acid:hydroquinone: formaldehyde): 1:1:2
Ratio (starting monomers:water): 1:2.52
Viscosity of the aqueous solution of the condensate: 23.9 (cP at 25° C., 30%)
Molecular weight: Mw: 4895

EXAMPLE 26

To a mixture of 3-aminobenzenesulfonic acid (17.32 g) and phenol (9.41 g) in water (55 ml) was added 20% aqueous sodium hydroxide (20.41 g) and the resulting solution was adjusted to pH 8.1 with 0.1N aqueous sodium hydroxide. The weight of the solution was adjusted to 112.10 g with water and then heated. To the solution was added 37% aqueous formaldehyde (16.23 g) under refluxing and the reaction mixture was stirred for 9.25 hours under refluxing (1st step). The mixture was cooled to room temperature, adjusted to pH 11.0 with 20% aqueous sodium hydroxide (5.14 g) and refluxed for 3 hours (2nd step) to afford an aqueous solution of the condensate (133.50 g).
Ratio (3-aminobenzenesulfonic acid:phenol: formaldehyde): 1:1:2
Ratio (starting monomers:water): 1:2.49
Molecular weight: Mw: 4891, Mn: 1091

EXAMPLE 27

To a mixture of 2-aminobenzenesulfonic acid (17.32 g) and phenol (9.41 g) in water (54 ml) was added 20% aqueous sodium hydroxide (20.39 g) and the resulting solution was adjusted to pH 8.1 with 0.1N aqueous sodium hydroxide. The weight of the solution was adjusted to 112.10 g with water and then heated. To the solution was added 37% aqueous formaldehyde (16.23 g) under refluxing and the reaction mixture was stirred for 9.25 hours under refluxing (1st step). The mixture was cooled to room temperature, adjusted to pH 11.0 with 20% aqueous sodium hydroxide (5.26 g) and refluxed for 3 hours (2nd step) to afford an aqueous solution of the condensate (133.60 g).
Ratio (2-aminobenzenesulfonic acid:phenol: formaldehyde): 1:1:2
Ratio (starting monomers:water): 1:2.49
Molecular weight: Mw: 5078, Mn: 1180

EXAMPLE 28

To a mixture of 2-aminobenzenesulfonic acid (17.32 g) and m-cresol (10.83 g) in water (63 ml) was added 20% aqueous sodium hydroxide (20.30 g) and the resulting solution was adjusted to pH 8.1 with 0.1N aqueous sodium hydroxide. The weight of the solution was adjusted to 118.30 g with water and then heated. To the solution was added 37% aqueous formaldehyde (16.23 g) under refluxing and the reaction mixture was stirred for 7.5 hours under refluxing (1st step). The mixture was cooled to room temperature, adjusted to pH 11.0 with 20% aqueous sodium hydroxide (3.08 g) and refluxed for 1 hour (2nd step) to afford an aqueous solution of the condensate (137.60 g).
Ratio (2-aminobenzenesulfonic acid:m-cresol: formaldehyde): 1:1:2
Ratio (starting monomers:water): 1:2.52
Viscosity of the aqueous solution of the condensate: 82.8 (cP at 25° C., 30%)

EXAMPLE 29

To a mixture of 2-amino-5-methylbenzenesulfonic acid (18.72 g) and phenol (9.41 g) in water (16 ml) was added 20% aqueous sodium hydroxide (20.00 g) and the mixture was stirred at 50° C. The resulting solution was adjusted to pH 7.92 with 0.1N aqueous sodium hydroxide. The weight of the solution was adjusted to 118.30 g with water and then heated. To the solution was added 37% aqueous formaldehyde (16.23 g) under refluxing and the reaction mixture was stirred for 7.5 hours under refluxing (1st step). The mixture was cooled to room temperature, adjusted to pH 11.0 with 20% aqueous sodium hydroxide (8.40 g) and refluxed for 1 hour (2nd step) to afford an aqueous solution of the condensate (142.90 g).
Ratio (2-amino-5-methylbenzenesulfonic acid:phenol: formaldehyde): 1:1:2
Ratio (starting monomers:water): 1:2.53
Viscosity of the aqueous solution of the condensate: 13.8 (cP at 25° C., 30%)
Molecular weight: Mw: 11870

EXAMPLE 30

To a mixture of 4-amino-1-naphthalenesulfonic acid (22.33 g) and phenol (9.41 g) in water (73 ml) was added 20% aqueous sodium hydroxide (19.90 g) and the resulting solution was adjusted to pH 8.1 with 0.1N aqueous sodium hydroxide. The weight of the solution was adjusted to 134.20 g with water and then heated. To the solution was added 37% aqueous formaldehyde (16.23 g) under refluxing and the reaction mixture was stirred for 7.5 hours under refluxing (1st step). The mixture was cooled to room temperature, adjusted to pH 11.0 with 20% aqueous sodium hydroxide (11.50 g) and refluxed for 1 hour (2nd step) to afford an aqueous solution of the condensate (162.10 g).
Ratio (4-amino-1-naphthalenesulfonic acid:phenol: formaldehyde): 1:1:2

Ratio (starting monomers:water): 1:2.61
Molecular weight: Mw: 2175

EXAMPLE 31

To a mixture of 4-aminobenzenesulfonic acid (303.1 g) and phenol (164.7 g) in water (115 ml) was added 20% aqueous sodium hydroxide (357.0 g) and the mixture was stirred at 70° C. The resulting solution was adjusted to pH 7.65 with 0.1N aqueous sodium hydroxide. The weight of the solution was adjusted to 990.7 g with water and then heated. To the solution was added 37% aqueous formaldehyde (284.0 g) under refluxing and the reaction mixture was stirred for 2 hours under refluxing (1st step). The mixture was cooled to room temperature, adjusted to pH 11.0 with 20% aqueous sodium hydroxide (184.4 g) and refluxed for 1 hour (2nd step) to afford an aqueous solution of the condensate (1459.1 g).
Ratio (4-aminobenzenesulfonic acid:phenol: formaldehyde): 1:1:2
Ratio (starting monomers:water): 1:0.98
Molecular weight: Mw: 3572, Mn: 918

Examples 32 to 35 was conducted in a similar manner to that of Example 31.

| | Stating monomers | | Polymerizing conditions | | | | Resulting condensate | | |
|---|---|---|---|---|---|---|---|---|---|
| | Ratio (4-amino- | | 1st Step | | 2nd Step | | | Molecular | |
| Example | benzenesulfonic acid: | Ratio (starting | Initial | Reaction | Initial | Reaction | | weight | |
| No. | phenol:formaldehyde) | monomers:water) | pH | time | pH | time | Viscosity | Mw | Mn |
| 32 | 0.8:1.2:2.2 | 1:0.99 | 7.65 | 2.0 | 11.0 | 1.0 | 27.2 | 4513 | |
| 33 | 0.8:1.2:2.4 | 1:0.97 | 7.65 | 2.0 | 11.0 | 1.0 | 17.1 | 4223 | |
| 34 | 1.2:0.8:2 | 1:0.96 | 7.65 | 2.0 | 11.0 | 1.0 | 5.4 | | |
| 35 | 1:1:1.8 | 1:1.00 | 7.65 | 2.0 | 11.0 | 1.0 | 7.2 | 4676 | 834 |

EXAMPLE 36

To a mixture of 4-aminobenzenesulfonic acid (17.32 g) and m-cresol (10.80 g) in water (173.2 ml) was added 20% aqueous sodium hydroxide (20.45 g) and the mixture was stirred at 85° C. The resulting solution was adjusted to pH 7.42 with 0.1N aqueous sodium hydroxide and then heated. To the solution was added 37% aqueous formaldehyde (16.23 g) under refluxing and the reaction mixture was stirred for 7.5 hours under refluxing (1st step). The mixture was cooled to room temperature, adjusted to pH 11.0 with 20% aqueous sodium hydroxide (2.87 g) and refluxed for 3 hours (2nd step) to afford an aqueous solution of the condensate (240.90 g).
Ratio (4-aminobenzenesulfonic acid:m-cresol: formaldehyde): 1:1:2
Ratio (starting monomers:water): 1:5.23
Viscosity of the aqueous solution of the condensate: 8.8 (cP at 25° C., 30%)
Molecular weight: Mw: 8981, Mn: 858

EXAMPLE 37

To a mixture of 3-aminobenzenesulfonic acid (17.32 g) and salicylic acid (13.80 g) in water (52 ml) was added 20% aqueous sodium hydroxide (40.60 g) and the resulting solution was adjusted to pH 8.20 with 0.1N aqueous sodium hydroxide. The weight of the solution was adjusted to 131.30 g with water and then heated. To the solution was added 37% aqueous formaldehyde (16.23 g) under refluxing and the reaction mixture was stirred for 7.5 hours under refluxing (1st step). The mixture was cooled to room temperature, adjusted to pH 11.2 with 20% aqueous sodium hydroxide (1.03 g) and refluxed for 3 hours (2nd step) to afford an aqueous solution of the condensate (148.60 g).
Ratio (3-aminobenzenesulfonic acid:salicylic acid: formaldehyde): 1:1:2
Ratio (starting monomers:water): 1:2.26
Viscosity of the aqueous solution of the condensate: 4.1 (cP at 25° C., 21.5%)
Molecular weight: Mw: 1110, Mn: 562

EXAMPLE 38

To a mixture of 4-aminobenzenesulfonic acid (8.65 g) and guaiacol (6.20 g) in water (117.3 ml) was added 20% aqueous sodium hydroxide (10.24 g) and the mixture was stirred at 80° C. The resulting solution was adjusted to pH 7.51 with 0.1N aqueous sodium hydroxide and then heated. To the solution was added 37% aqueous formaldehyde (8.12 g) under refluxing and the reaction mixture was stirred for 7.5 hours under refluxing (1st step). The mixture was cooled to room temperature, adjusted to pH 11.0 with 20% aqueous sodium hydroxide (9.39 g) and refluxed for 3 hours (2nd step) to afford an aqueous solution of the condensate (93.30 g).
Ratio (4-aminobenzenesulfonic acid:guaiacol: formaldehyde): 1:1:2
Ratio (starting monomers:water): 1:6.56
Viscosity of the aqueous solution of the condensate: 9.3 (cP at 25° C., 30%)
Molecular weight: Mw: 1215, Mn: 432

EXAMPLE 39

To a mixture of 4-aminobenzenesulfonic acid (8.65 g) and salicylic acid (6.91 g) in water (24 ml) was added 20% aqueous sodium hydroxide (20.12 g) and the mixture was stirred at 75° C. The resulting solution was adjusted to pH 7.58 with 0.1N aqueous sodium hydroxide. The weight of the solution was adjusted to 73.80 g with water and then heated. To the solution was added 37% aqueous formaldehyde (8.12 g) under refluxing and the reaction mixture was stirred for 7.5 hours under refluxing (1st step). The mixture was cooled to room temperature, adjusted to pH 11.0 with 20% aqueous sodium hydroxide and refluxed for 3 hours (2nd step) to afford an aqueous solution of the condensate.
Ratio (4-aminobenzenesulfonic acid:salicylic acid:formaldehyde): 1:1:2
Ratio (starting monomers:water): 1:2.27
Viscosity of the aqueous solution of the condensate: 5.7 (cP at 25° C., 30%)
Molecular weight: Mw: 1464, Mn: 552

What we claim is:

1. Aminobenzenesulfonic acid-phenol-formaldehyde condensate prepared by polymerizing an initially prepared mixture of 20 to 70 parts by weight of 4-aminobenzenesulfonic acid, 10 to 50 parts by weight of phenol and 10 to 40 parts by weight of formaldehyde all parts by weight confined to the complete weight of the mixture, in two steps under alkaline conditions, wherein the pH of the first step ranges from 7.4 to 8.5 and the pH of the second step ranges from 10 to 12 carried out at a higher pH.

2. The condensate of claim 1 in which sodium hydroxide is employed to establish alkaline conditions.

* * * * *